US012557932B2

(12) United States Patent
Waggoner et al.

(10) Patent No.: US 12,557,932 B2

(45) Date of Patent: *Feb. 24, 2026

---

(54) ADDITIVE DELIVERY SYSTEMS AND CONTAINERS

(71) Applicant: Cirkul, Inc., Tampa, FL (US)

(72) Inventors: Garrett S. Waggoner, Tampa, FL (US); Andrew Gay, Tampa, FL (US); Christopher Jasperse, Pittsburgh, KS (US)

(73) Assignee: Cirkul, Inc., Tampa, FL (US)

( * ) Notice: Subject to any disclaimer, the term of this patent is extended or adjusted under 35 U.S.C. 154(b) by 1090 days.

This patent is subject to a terminal disclaimer.

(21) Appl. No.: 17/567,799

(22) Filed: Jan. 3, 2022

(65) Prior Publication Data

US 2022/0248893 A1 Aug. 11, 2022

Related U.S. Application Data

(63) Continuation of application No. 17/539,833, filed on Dec. 1, 2021, now Pat. No. 12,329,307, and a
(Continued)

(51) Int. Cl.
*A47J 31/00* (2006.01)

(52) U.S. Cl.
CPC .................................... *A47J 31/005* (2013.01)

(58) Field of Classification Search
CPC ............. C12N 15/8205; C12N 15/8207; A47J 31/005; Y02E 60/10; Y02P 70/50
(Continued)

(56) References Cited

U.S. PATENT DOCUMENTS

| 715,425 | A | 12/1902 | Schamp |
|---|---|---|---|
| 933,464 | A | 9/1909 | Kasjens |

(Continued)

FOREIGN PATENT DOCUMENTS

| AU | 2017228456 A1 | 8/2018 |
|---|---|---|
| AU | 2018225178 A1 | 9/2019 |

(Continued)

OTHER PUBLICATIONS

International Search Report and Written Opinion mailed May 7, 2021 in connection with International Application No. PCT/US2020/062521.

(Continued)

*Primary Examiner* — Steven W Crabb
*Assistant Examiner* — Ket D Dang
(74) *Attorney, Agent, or Firm* — Wolf, Greenfield & Sacks, P.C.

(57) ABSTRACT

A compact filtering and additive delivery system which is readily adaptable to a portable container, such as a sports bottle, and receives a modular additive container for the metered delivery of additive, such as flavor concentrate, to a stream of base liquid as the base liquid is drawn or dispensed from the container. The modular additive container configuration on the delivery system allows a consumer/user to experience different additives, such as different flavors or supplement compositions, for a given supply of base liquid, such as water, stored in the container. The system may be readily used with off-the-shelf containers, such as disposable water bottles. An additive container configuration provides modular additive delivery system as described herein.

19 Claims, 6 Drawing Sheets

Related U.S. Application Data continuation of application No. 15/791,348, filed on Oct. 23, 2017, now Pat. No. 11,213,159, which is a continuation of application No. 14/181,354, filed on Feb. 14, 2014, now Pat. No. 9,795,242.

(60) Provisional application No. 61/764,861, filed on Feb. 14, 2013.

(58) Field of Classification Search
USPC .......................................................... 99/323
See application file for complete search history.

(56) References Cited

U.S. PATENT DOCUMENTS

| | | | |
|---|---|---|---|
| 1,118,278 A | 11/1914 | Greathead | |
| 1,321,358 A | 11/1919 | Beck | |
| 1,674,233 A | 6/1928 | Williams | |
| 1,879,269 A | 9/1932 | Hutchison | |
| 1,961,321 A | 6/1934 | Young | |
| 2,073,273 A | 3/1937 | Erna et al. | |
| 2,102,105 A | 12/1937 | Edward | |
| 2,493,660 A | 1/1950 | Elkins | |
| 3,200,995 A | 8/1965 | Gangwisch | |
| 3,207,486 A | 9/1965 | Daniel | |
| 3,217,931 A | 11/1965 | Farrar et al. | |
| 3,255,691 A | 6/1966 | Marius et al. | |
| 3,325,056 A | 6/1967 | Lewis | |
| 3,347,403 A | 10/1967 | Lehrman | |
| 3,463,361 A | 8/1969 | Cook et al. | |
| 3,506,460 A | 4/1970 | Bayne | |
| 3,508,682 A | 4/1970 | Hollis et al. | |
| 3,641,016 A | 2/1972 | Korosi et al. | |
| 3,760,986 A | 9/1973 | Castner et al. | |
| 3,850,346 A | 11/1974 | Richardson et al. | |
| 3,924,741 A | 12/1975 | Kachur et al. | |
| 4,115,066 A | 9/1978 | Muhle | |
| 4,132,308 A | 1/1979 | Goncalves | |
| 4,221,291 A | 9/1980 | Hunt | |
| 4,315,570 A | 2/1982 | Silver et al. | |
| 4,785,974 A | 11/1988 | Rudick et al. | |
| 4,838,457 A | 6/1989 | Swahl et al. | |
| 4,892,125 A | 1/1990 | Rudick et al. | |
| 4,964,732 A | 10/1990 | Cadeo et al. | |
| 5,045,195 A | 9/1991 | Spangrud et al. | |
| 5,092,750 A | 3/1992 | Leroy et al. | |
| 5,094,861 A | 3/1992 | D'Auguste et al. | |
| 5,154,325 A | 10/1992 | Ryder et al. | |
| 5,165,569 A | 11/1992 | Furuhashi et al. | |
| 5,246,139 A | 9/1993 | Duceppe | |
| 5,325,996 A | 7/1994 | Bannigan | |
| 5,419,445 A | 5/1995 | Kaesemeyer | |
| 5,632,420 A | 5/1997 | Lohrman et al. | |
| 5,641,410 A | 6/1997 | Peltzer | |
| 5,664,702 A | 9/1997 | Beauchamp | |
| 5,707,353 A | 1/1998 | Mazer et al. | |
| 5,839,626 A | 11/1998 | Gross et al. | |
| 5,890,624 A | 4/1999 | Klima et al. | |
| 5,899,363 A | 5/1999 | Bliss, III et al. | |
| 5,919,360 A | 7/1999 | Contaxis, III et al. | |
| 5,944,234 A | 8/1999 | Lampe et al. | |
| 5,984,141 A | 11/1999 | Gibler | |
| 5,992,690 A | 11/1999 | Tracy | |
| 5,993,671 A | 11/1999 | Peltzer | |
| 6,003,728 A * | 12/1999 | Elliott ................ | B65D 47/0804 |
| | | | 222/129 |
| 6,010,034 A | 1/2000 | Walthers | |
| 6,116,466 A | 9/2000 | Gueret | |
| 6,136,189 A | 10/2000 | Smith et al. | |
| 6,165,523 A | 12/2000 | Story | |
| 6,180,149 B1 | 1/2001 | Gramm | |
| 6,209,757 B1 | 4/2001 | Dumont | |
| 6,224,778 B1 | 5/2001 | Peltzer | |
| 6,230,923 B1 | 5/2001 | Hung | |
| 6,230,937 B1 | 5/2001 | Johnson et al. | |
| 6,263,924 B1 | 7/2001 | Grosser | |
| 6,395,170 B1 | 5/2002 | Hughes et al. | |
| 6,482,451 B1 | 11/2002 | Baron | |
| 6,517,878 B2 | 2/2003 | Heczko | |
| 6,541,055 B1 | 4/2003 | Luzenberg | |
| 6,569,329 B1 | 5/2003 | Nohren | |
| 6,705,490 B1 | 3/2004 | Lizerbram et al. | |
| 6,705,491 B1 | 3/2004 | Lizerbram et al. | |
| 6,820,740 B1 | 11/2004 | Spector | |
| 6,854,595 B2 | 2/2005 | Kiser | |
| 6,923,568 B2 | 8/2005 | Wilmer et al. | |
| 6,959,839 B2 | 11/2005 | Roth et al. | |
| 6,981,962 B1 | 1/2006 | Lenkersdorf | |
| 7,083,071 B1 | 8/2006 | Crisp, III et al. | |
| 7,118,012 B2 | 10/2006 | Butler | |
| 7,306,117 B2 | 12/2007 | Roth et al. | |
| 7,503,453 B2 | 3/2009 | Cronin et al. | |
| 7,533,786 B2 | 5/2009 | Woolfson et al. | |
| 7,568,576 B2 | 8/2009 | Sweeney, Jr. et al. | |
| 7,658,303 B2 | 2/2010 | Woolfson et al. | |
| 7,661,561 B2 | 2/2010 | Ophardt et al. | |
| 7,670,479 B2 | 3/2010 | Arett et al. | |
| 7,806,294 B2 | 10/2010 | Gatipon et al. | |
| 7,819,276 B2 | 10/2010 | Naisje | |
| 7,909,210 B2 | 3/2011 | Roth et al. | |
| 7,942,569 B2 | 5/2011 | Orben et al. | |
| 7,947,316 B2 | 5/2011 | Kirschner et al. | |
| 8,083,055 B2 | 12/2011 | Simonian et al. | |
| 8,141,700 B2 | 3/2012 | Simonian et al. | |
| 8,167,174 B2 | 5/2012 | Berger | |
| 8,182,683 B1 | 5/2012 | Allen | |
| 8,230,777 B2 * | 7/2012 | Anson ................. | B65D 47/243 |
| | | | 220/501 |
| 8,302,803 B1 | 11/2012 | Greenberg et al. | |
| 8,306,655 B2 | 11/2012 | Newman | |
| 8,313,644 B2 | 11/2012 | Harris et al. | |
| 8,365,960 B1 | 2/2013 | Kalaouze | |
| 8,413,844 B2 | 4/2013 | Arett et al. | |
| 8,453,833 B2 | 6/2013 | Porter | |
| 8,464,633 B2 | 6/2013 | Anson et al. | |
| 8,511,465 B2 | 8/2013 | Seelhofer | |
| 8,541,039 B2 | 9/2013 | Lackey et al. | |
| 8,580,753 B2 | 11/2013 | Bondarev | |
| 8,590,753 B2 | 11/2013 | Marina et al. | |
| 8,622,237 B2 | 1/2014 | Choi et al. | |
| 8,641,016 B2 | 2/2014 | Tatera | |
| 8,684,231 B2 | 4/2014 | Lane et al. | |
| 8,684,240 B2 | 4/2014 | Sauer et al. | |
| 8,777,182 B2 | 7/2014 | Springer | |
| 8,893,927 B2 | 11/2014 | Olson et al. | |
| 8,931,634 B2 | 1/2015 | Anderson | |
| 9,010,379 B2 | 4/2015 | Gothard et al. | |
| 9,060,592 B2 | 6/2015 | Brosius | |
| 9,090,395 B2 | 7/2015 | Koumans | |
| 9,174,777 B2 | 11/2015 | Defemme et al. | |
| 9,302,831 B2 | 4/2016 | Nilson et al. | |
| 9,498,086 B2 | 11/2016 | Waggoner et al. | |
| 9,650,189 B1 | 5/2017 | Lawson et al. | |
| 9,694,953 B2 | 7/2017 | Meyers et al. | |
| 9,771,195 B2 | 9/2017 | Lawson et al. | |
| 9,795,242 B2 | 10/2017 | Waggoner et al. | |
| 9,801,492 B1 | 10/2017 | Lin | |
| 9,821,288 B2 | 11/2017 | Cerk et al. | |
| 10,093,479 B2 | 10/2018 | Fuchs et al. | |
| 10,232,998 B2 | 3/2019 | Presche | |
| 10,349,766 B2 | 7/2019 | Asseldonk et al. | |
| 10,843,142 B2 | 11/2020 | Waggoner et al. | |
| 10,888,826 B2 | 1/2021 | Waggoner et al. | |
| 11,213,159 B2 | 1/2022 | Waggoner et al. | |
| 11,406,946 B2 | 8/2022 | Waggoner et al. | |
| 11,583,811 B2 | 2/2023 | Waggoner et al. | |
| 12,017,191 B2 | 6/2024 | Waggoner et al. | |
| 12,145,113 B2 | 11/2024 | Waggoner et al. | |
| 12,145,114 B2 | 11/2024 | Waggoner et al. | |
| 12,157,096 B2 | 12/2024 | Waggoner et al. | |
| 2001/0025859 A1 | 10/2001 | Dumont | |
| 2001/0055242 A1 | 12/2001 | Deshmukh et al. | |
| 2003/0168474 A1 | 9/2003 | Nidgery | |

(56) References Cited

U.S. PATENT DOCUMENTS

| | | | |
|---|---|---|---|
| 2004/0007481 A1* | 1/2004 | Kiser, Jr. | B65D 51/2892 |
| | | | 206/219 |
| 2004/0007594 A1 | 1/2004 | Esch et al. | |
| 2004/0116036 A1 | 6/2004 | Nugent et al. | |
| 2004/0155061 A1* | 8/2004 | Roth | B65D 47/243 |
| | | | 222/145.5 |
| 2004/0188280 A1 | 9/2004 | Young | |
| 2004/0262331 A1 | 12/2004 | Noolfson et al. | |
| 2005/0115845 A1 | 6/2005 | Cho | |
| 2005/0127101 A1* | 6/2005 | Roth | B65D 47/243 |
| | | | 222/145.5 |
| 2005/0182356 A1 | 8/2005 | Dixon | |
| 2005/0234422 A1 | 10/2005 | Oh et al. | |
| 2005/0258082 A1 | 11/2005 | Lund et al. | |
| 2006/0011664 A1 | 1/2006 | Hammond | |
| 2006/0021511 A1 | 2/2006 | Paasch et al. | |
| 2006/0021919 A1 | 2/2006 | Olson et al. | |
| 2006/0144244 A1 | 7/2006 | Girard et al. | |
| 2007/0102394 A1 | 5/2007 | Olsen et al. | |
| 2007/0138179 A1 | 6/2007 | Jacobs et al. | |
| 2007/0199955 A1 | 8/2007 | Stalions et al. | |
| 2007/0253280 A1 | 11/2007 | Orben et al. | |
| 2008/0078200 A1 | 4/2008 | Roth et al. | |
| 2008/0099487 A1 | 5/2008 | Winn | |
| 2008/0116221 A1 | 5/2008 | Roth et al. | |
| 2008/0149585 A1 | 6/2008 | Valentine | |
| 2008/0190958 A1 | 8/2008 | Wyner et al. | |
| 2009/0026222 A1 | 1/2009 | Seelhofer | |
| 2009/0226585 A1 | 9/2009 | Wroblewski et al. | |
| 2009/0236303 A1 | 9/2009 | Lizerbram et al. | |
| 2010/0012193 A1 | 1/2010 | Anson et al. | |
| 2010/0065584 A1 | 3/2010 | Berger | |
| 2010/0108715 A1 | 5/2010 | Santagiuliana | |
| 2010/0157723 A1 | 6/2010 | Vega | |
| 2010/0213223 A1 | 8/2010 | Ballentine | |
| 2011/0006071 A1 | 1/2011 | Koumans | |
| 2011/0089059 A1 | 4/2011 | Lane et al. | |
| 2011/0113972 A1* | 5/2011 | Tatera | B01F 35/7547 |
| | | | 99/323.1 |
| 2011/0168026 A1 | 7/2011 | Cahen et al. | |
| 2011/0259769 A1 | 10/2011 | Salinas | |
| 2011/0290677 A1 | 12/2011 | Simonian et al. | |
| 2011/0290678 A1 | 12/2011 | Simonian et al. | |
| 2012/0000880 A1 | 1/2012 | Im | |
| 2012/0017766 A1 | 1/2012 | Anson et al. | |
| 2012/0031925 A1 | 2/2012 | Greenberg | |
| 2012/0223100 A1 | 9/2012 | Simonian et al. | |
| 2012/0255973 A1 | 10/2012 | Schlueter et al. | |
| 2013/0000733 A1 | 1/2013 | Gothard et al. | |
| 2013/0008919 A1 | 1/2013 | Honan et al. | |
| 2013/0139893 A1 | 6/2013 | Anson et al. | |
| 2013/0240564 A1 | 9/2013 | Albaum | |
| 2013/0319915 A1 | 12/2013 | Gellibolian et al. | |
| 2013/0334250 A1 | 12/2013 | Albaum | |
| 2014/0076173 A1 | 3/2014 | Dellaud et al. | |
| 2014/0092703 A1 | 4/2014 | Helou et al. | |
| 2014/0230659 A1 | 8/2014 | Waggoner et al. | |
| 2014/0263443 A1 | 9/2014 | Furusawa et al. | |
| 2015/0065587 A1 | 3/2015 | Ochoa et al. | |
| 2015/0128811 A1 | 5/2015 | Durairajasivam et al. | |
| 2015/0147430 A1 | 5/2015 | Dzikowicz et al. | |
| 2015/0158654 A1 | 6/2015 | Petrov | |
| 2015/0307265 A1 | 10/2015 | Winn et al. | |
| 2015/0336722 A1 | 11/2015 | Brook-Chrispin et al. | |
| 2015/0336724 A1 | 11/2015 | Simonian et al. | |
| 2016/0001936 A1 | 1/2016 | Rap et al. | |
| 2016/0143583 A1 | 5/2016 | Jeukendrup et al. | |
| 2016/0150914 A1 | 6/2016 | Waggoner et al. | |
| 2016/0152408 A1 | 6/2016 | Fuchs et al. | |
| 2016/0159632 A1 | 6/2016 | Wheatley et al. | |
| 2016/0317985 A1 | 11/2016 | Mutschler et al. | |
| 2017/0043999 A1 | 2/2017 | Murison et al. | |
| 2017/0156540 A1 | 6/2017 | Waggoner et al. | |
| 2017/0232406 A1 | 8/2017 | Waggoner et al. | |
| 2017/0296988 A1 | 10/2017 | Waggoner et al. | |

| | | | |
|---|---|---|---|
| 2018/0178957 A1 | 6/2018 | Zalewski | |
| 2018/0296023 A1 | 10/2018 | Waggoner et al. | |
| 2019/0060849 A1 | 2/2019 | Waggoner et al. | |
| 2019/0291065 A1 | 9/2019 | Waggoner et al. | |
| 2020/0139313 A1 | 5/2020 | Waggoner et al. | |
| 2020/0156020 A1 | 5/2020 | Waggoner et al. | |
| 2021/0060503 A1 | 3/2021 | Waggoner et al. | |
| 2021/0169264 A1 | 6/2021 | Waggoner et al. | |
| 2021/0252464 A1 | 8/2021 | Waggoner et al. | |
| 2021/0345801 A1 | 11/2021 | Talabot | |
| 2022/0009697 A1 | 1/2022 | Olmstead et al. | |
| 2022/0117372 A1 | 4/2022 | Lecchini et al. | |
| 2022/0175174 A1 | 6/2022 | Waggoner et al. | |
| 2022/0248892 A1 | 8/2022 | Waggoner et al. | |
| 2022/0248893 A1* | 8/2022 | Waggoner | A47J 31/005 |
| 2022/0248894 A1* | 8/2022 | Waggoner | A47J 31/005 |
| 2023/0084794 A1 | 3/2023 | Waggoner et al. | |
| 2023/0226503 A1 | 7/2023 | Waggoner et al. | |
| 2024/0116014 A1 | 4/2024 | Wong et al. | |
| 2024/0138613 A1 | 5/2024 | Waggoner et al. | |
| 2025/0033005 A1 | 1/2025 | Waggoner et al. | |
| 2025/0041811 A1 | 2/2025 | Waggoner et al. | |
| 2025/0072648 A1 | 3/2025 | Waggoner et al. | |
| 2025/0073650 A1 | 3/2025 | Waggoner et al. | |

FOREIGN PATENT DOCUMENTS

| | | |
|---|---|---|
| AU | 2015349694 B2 | 5/2020 |
| CA | 2777990 A1 | 11/2013 |
| CA | 2968546 A1 | 5/2016 |
| CA | 3053808 A1 | 8/2018 |
| CN | 1213634 A | 4/1999 |
| CN | 1271257 A | 10/2000 |
| CN | 1607167 A | 4/2005 |
| CN | 1754788 A | 4/2006 |
| CN | 1953938 A | 4/2007 |
| CN | 101300190 A | 11/2008 |
| CN | 101432221 A | 5/2009 |
| CN | 102123938 A | 7/2011 |
| CN | 101068745 B | 6/2012 |
| CN | 102740812 A | 10/2012 |
| CN | 106132289 A | 11/2016 |
| CN | 207561774 U | 7/2018 |
| CN | 110612050 A | 12/2019 |
| CN | 107205565 B | 7/2020 |
| CN | 113396018 A | 9/2021 |
| CN | 114794870 A | 7/2022 |
| EP | 0 545 678 A2 | 6/1993 |
| EP | 0 564 208 A1 | 10/1993 |
| EP | 0 795 267 A2 | 9/1997 |
| EP | 1 407 827 A2 | 4/2004 |
| EP | 1 876 901 B1 | 11/2011 |
| EP | 3 220 783 B1 | 8/2019 |
| EP | 3 585 224 A1 | 1/2020 |
| JP | S60-92965 U | 6/1985 |
| JP | S61-43134 U | 3/1986 |
| JP | H01-126934 U | 8/1989 |
| JP | H06-8999 A | 1/1994 |
| JP | H07-132979 A | 5/1995 |
| JP | H11-508215 A | 7/1999 |
| JP | 2001-500205 A | 1/2001 |
| JP | 2003-200088 A | 7/2003 |
| JP | 2004-531430 A | 10/2004 |
| JP | 2005-289518 A | 10/2005 |
| JP | 2006-264761 A | 10/2006 |
| JP | 2009-107672 A | 5/2009 |
| JP | 2009-523576 A | 6/2009 |
| JP | 2010-195481 A | 9/2010 |
| JP | 2012-006663 A | 1/2012 |
| JP | 2012-188142 A | 10/2012 |
| JP | 2013-517188 A | 5/2013 |
| JP | 2013-545673 A | 12/2013 |
| JP | 2014-208281 A | 11/2014 |
| JP | 2016-011125 A | 1/2016 |
| JP | 2016-512979 A | 5/2016 |
| JP | 2018-503571 A | 2/2018 |
| KR | 20160116579 A | 10/2016 |
| SG | 11201407344 | 12/2014 |
| WO | WO 97/22530 A1 | 6/1997 |

(56) References Cited

FOREIGN PATENT DOCUMENTS

| WO | WO 98/005853 A1 | 2/1998 |
| WO | WO 99/08578 A1 | 2/1999 |
| WO | WO 99/47450 A1 | 9/1999 |
| WO | WO 2001/000521 A1 | 1/2001 |
| WO | WO 2002/074441 A2 | 9/2002 |
| WO | WO 2011/149501 A1 | 12/2011 |
| WO | WO 2013/169466 A1 | 11/2013 |
| WO | WO 2016/081925 A1 | 5/2016 |
| WO | WO 2017/152192 A1 | 9/2017 |
| WO | WO 2018/156816 A1 | 8/2018 |
| WO | WO 2020/046976 A3 | 7/2020 |
| WO | WO 2021/108781 A1 | 6/2021 |

OTHER PUBLICATIONS

Partial Supplemental European Search Report dated Apr. 19, 2022 in connection with European Application No. 19854883.6.

International Preliminary Report on Patentability mailed Mar. 11, 2021 in connection with International Application No. PCT/US2019/048389.

International Search Report and Written Opinion mailed Jan. 17, 2020 in connection with International Application No. PCT/US2019/048389.

International Search Report and Written Opinion mailed Dec. 23, 2021 connection with International Application No. PCT/US2021/041887.

Invitation to Pay Additional Fees mailed Oct. 6, 2021 in connection with International Application No. PCT/US2021/041887.

Chinese Office Action and English Translation thereof dated Oct. 27, 2021 in connection with Chinese Application No. 201880012762.X.

Extended European Search Report and Opinion dated Nov. 16, 2020 in connection with European Application No. 18757631.9.

International Preliminary Report on Patentability mailed Sep. 6, 2019 in connection with International Application No. PCT/US2018/019295.

International Search Report and Written Opinion mailed May 16, 2018 in connection with International Application No. PCT/US2018/019295.

Australia Office Action dated May 10, 2019 in connection with Australia Application No. Application 2015349694.

Australian Office Action dated May 17, 2022 in connection with Australian Application No. 2020217420.

Australian Office Action dated May 31, 2021 in connection with Australian Application No. 2020217420.

Chinese Office Action and English Translation thereof dated Jan. 8, 2019 in connection with Chinese Application No. 201580062670.9.

Extended European Search Report and Opinion dated Jun. 13, 2018 in connection with European Application No. 15861063.4.

Japanese Office Action and English translation thereof dated Jul. 30, 2019 in connection with Japanese Application No. 2017-545871.

Japanese Office Action and English translation thereof dated Aug. 6, 2021 in connection with Japanese Application No. 2020-113813.

International Preliminary Report on Patentability mailed Jun. 1, 2017 in connection with International Application No. PCT/US2015/062026.

International Search Report and Written Opinion mailed Feb. 5, 2016 in connection with International App. No. PCT/US2015/062026.

Australian Office Action dated Jan. 25, 2022 in connection with Australian Application No. 2017228456.

Chinese Office Action and English Translation thereof dated May 13, 2020 in connection with Chinese Application No. 201780013261.9.

Extended European Search Report dated Jul. 9, 2019 in connection with European Application 17760997.1.

Supplemental European Search Report dated Jul. 26, 2019 in connection with European Application 17760997.1.

Japanese Office Action and English translation thereof dated Mar. 30, 2021 in connection with Japanese Application No. 2018-545355.

International Preliminary Report on Patentability mailed Sep. 4, 2018 in connection with International Application No. PCT/US2017/021016.

International Search Report and Written Opinion mailed Jun. 6, 2017 in connection with International Application No. PCT/US2017/021016.

[No Author Listed], How to Clean a Draft Beer Tap Keg Coupler. Youtube.com, Leaders Beverage, Aug. 6, 2014;1 page. (https://www.youtube.com/watch?v=LmtdkjdEq1E) 0:00-6:03.

[No Author Listed], Inspection Keg 1/2 BBL. GW Kent, Mar. 24, 2017; 3 pages. (https://web.archive.org/web/20170424051250/http://www.gwkent.com/inspection-keg.html).

International Search Report and Written Opinion mailed Dec. 27, 2023 in connection with International Application No. PCT/IB2023/059320.

Extended European Search Report and Opinion dated Sep. 9, 2024 in connection with European Application No. 24177797.8.

U.S. Appl. No. 16/235,913, filed Dec. 28, 2018, Waggoner et al.
U.S. Appl. No. 18/078,080, filed Dec. 8, 2022, Waggoner et al.
U.S. Appl. No. 17/539,833, filed Dec. 1, 2021, Waggoner et al.
U.S. Appl. No. 17/567,796, filed Jan. 3, 2022, Waggoner et al.
U.S. Appl. No. 17/567,801, filed Jan. 3, 2022, Waggoner et al.
U.S. Appl. No. 17/067,546, filed Oct. 9, 2020, Waggoner et al.
U.S. Appl. No. 18/380,129, filed Oct. 13, 2023, Waggoner et al.
U.S. Appl. No. 16/436,861, filed Jun. 10, 2019, Waggoner et al.
U.S. Appl. No. 17/146,463, filed Jan. 11, 2021, Waggoner et al.
U.S. Appl. No. 17/884,553, filed Aug. 9, 2022, Waggoner et al.
PCT/US2020/62521, May 7, 2021, International Search Report and Written Opinion.
EP19854883.6, Apr. 19, 2022, Extended European Search Report.
PCT/US2019/048389, Mar. 11, 2021, International Preliminary Report on Patentability.
PCT/US2019/048389, Jan. 17, 2020, International Search Report and Written Opinion.
PCT/US2021/041887, Dec. 23, 2021, International Search Report and Written Opinion.
PCT/US2021/041887, Oct. 6, 2021, Invitation to Pay Additional Fees.
CN201880112762.X, Oct. 27, 2021, Office Action.
EP18757631.9, Nov. 16, 2020, Supplemental European Search Report.
PCT/Us2018/019295, Sep. 6, 2019, International Preliminary Report on Patentability.
PCT/US2018/019295, May 16, 2018, International Search Report and Written Opinion.
AU2015349694, May 10, 2019, Office Action.
AU2020217420, May 17, 2022, Office Action.
AU2020217420, May 31, 2021, Office Action.
CN201580062670.9, Jan. 8, 2019, Office Action.
EP15861063.4, Jun. 13, 2018, Extended European Seach Report and Opinion.
JP2017-545871, Jul. 30, 2019, Office Action.
JP2020-113813, Aug. 6, 2021, Office Action.
PCT/US2015/062026, Jun. 1, 2017, International Preliminary Report on Patentability.
PCT/US2015/062026, Feb. 5, 2016, International Search Report and Written Opinion.
AU2017228456, Jan. 25, 2022, Office Action.
CN201780013261.9, May 13, 2020, Office Action.
EP17760997.1, Jul. 9, 2019, Extended European Search Report.
EP17760997.1, Jul. 26, 2019, Supplemental European Search Report.
JP2018-545355, Mar. 30, 2021, Office Action.
PCT/US2017/021016, Sep. 4, 2018, International Preliminary Report on Patentability.
PCT/US2017/021016, Jun. 6, 2017, International Search Report and Written Opinion.
U.S. Appl. No. 18/371,187, filed Sep. 21, 2023, Wong et al.
PCT/IB2023/059320, Dec. 27, 2023, International Search Report and Written Opinion.
EP24177797.8, Sep. 9, 2024, Extended European Search Report.

(56)  References Cited

OTHER PUBLICATIONS

International Preliminary Report on Patentability mailed Apr. 17, 2025 in connection with International Application No. PCT/IB2023/059320.

\* cited by examiner

122

120

130
123
125
129
127
128
214

200

212

142
141

144
145
143

155

151
154
150

156
180
152
157
153

174
160

172

ADDITIVE DELIVERY SYSTEMS AND CONTAINERS

CROSS-REFERENCE TO RELATED APPLICATIONS

This application is a continuation and claims the priority benefit of U.S. patent application Ser. No. 17/539,833, filed on Dec. 1, 2021. This application is a continuation and claims the priority benefit of U.S. patent application Ser. No. 15/791,348, filed on Oct. 23, 2017, which is a continuation and claims the priority benefit of U.S. patent application Ser. No. 14/181,354, filed on Feb. 14, 2014, of the same title, now U.S. Pat. No. 9,795,242, which claims the priority benefit of U.S. Provisional Patent Application Ser. No. 61/764,861, titled "BOTTLE WITH REMOVABLE FLAVOR CARTRIDGE IN WHICH FLAVOR CONCENTRATE MIXES WITH WATER AS USER DRINKS," filed on Feb. 14, 2013. The disclosures and subject matter of all of the above-described applications is incorporated by reference herein in its entirety.

BACKGROUND

1. Technical Field

The disclosure relates to dispensing and delivery systems for beverages and other products. More specifically, the disclosure relates to dispensing and delivery systems for providing an additive, such as flavoring or supplements, to a base liquid, such as water, as the base liquid is dispensed from a container. The disclosure also relates to containers for containing and storing an additive to be used in additive delivery systems.

2. Prior Art

The prior art includes various devices for providing additives to a base liquid. Such devices include pre-mix systems, such as those exemplified in U.S. Pat. No. 7,306, 117, in which a predetermined amount of additive is dispensed into a base liquid within the container and mixed therewith prior to consumption.

Prior art systems also include additive delivery systems in which an additive is dispensed as a base fluid is dispensed from a container. Such delivery systems are exemplified by U.S. Pat. No. 8,230,777, which describes a dispensing system in which a base liquid flows through a supplement area containing solid supplements, and U.S. Pat. No. 8,413, 844, which describes a water dispenser (pitcher) having a filter and an additive chamber in which the additive is dispensed as water is poured from the dispenser.

Such prior art systems, however, suffer from the drawbacks of requiring rather elaborate and relatively expensive dispensing systems and fail to combine filtration and additive delivery functionality in a manner that is readily adapted to portable, compact, portable containers, such as sports bottles. There is thus a need for additive delivery systems and additive containers that are readily adaptable to portable base liquid containers and which address the aforementioned and other needs in the art.

SUMMARY OF THE INVENTION

One aspect of the invention provides a compact filtering and additive delivery system, which is readily adaptable to a portable container, such as a sports bottle. The additive delivery system provides filtration and additive delivery to a base liquid while maintaining a generally consistent flow direction of the base liquid. The additive delivery system may receive a modular additive container selected by the user and provides for the metered delivery of additive, such as flavor concentrate, to a stream of base liquid as the base liquid is drawn or dispensed from the bottle. The modular additive container configuration on the delivery system allows a consumer/user to experience different additives, such as different flavors or supplement compositions, for a given supply of base liquid, such as water, stored in the container.

Another aspect of the invention provides a compact filtering and additive delivery system that may be used with off-the-shelf containers, such as disposable water bottles.

Yet another aspect of the invention provides a container configuration that is suitable for a modular additive delivery system as described herein.

Yet another aspect of the invention provides for uniform mixing of additive to a base liquid as the mixture is consumed, as well as a substantially uni-directional flow of base liquid and mixed additive/base liquid composition from the container.

BRIEF DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto.

DETAILED DESCRIPTION

Figure 1:
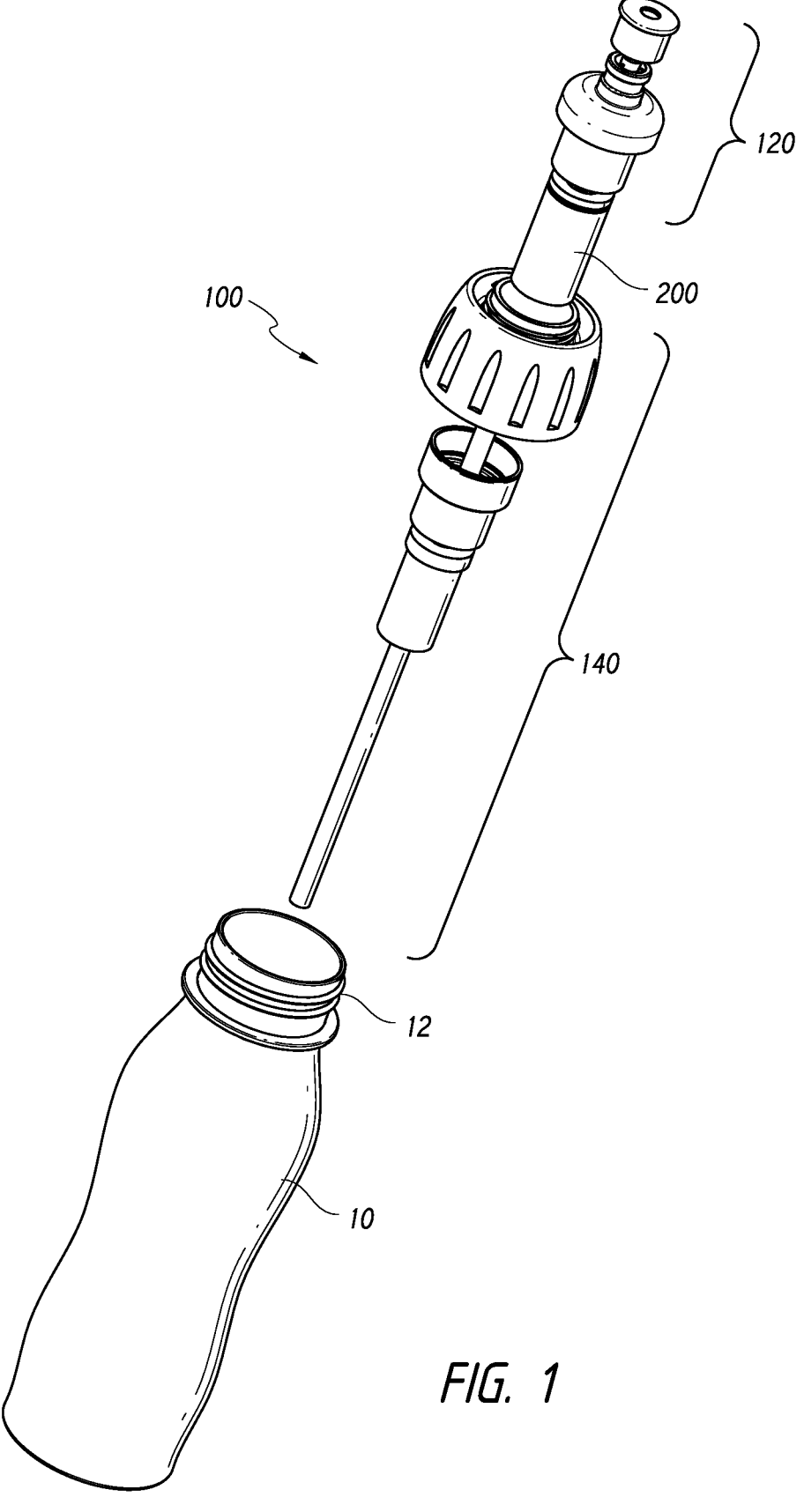
FIG. 1 is an exploded isometric view of an additive delivery system, combined with a sports bottle and filtration system according to an aspect of the invention.

Referring to FIG. 1, an additive delivery system 100 according to an aspect of the invention includes an upper cap assembly 120 and a lower cap assembly 140, in combination with a sports bottle 10. Sports bottle 10 may include an inner volume for containing a base fluid, such as water, and a threaded mouth 12 for receiving and sealingly engaging the lower cap assembly 140. As will be described in more detail below, upper cap assembly 120 and lower cap assembly 140 cooperate to house a removable additive module 200.

Figure 2:
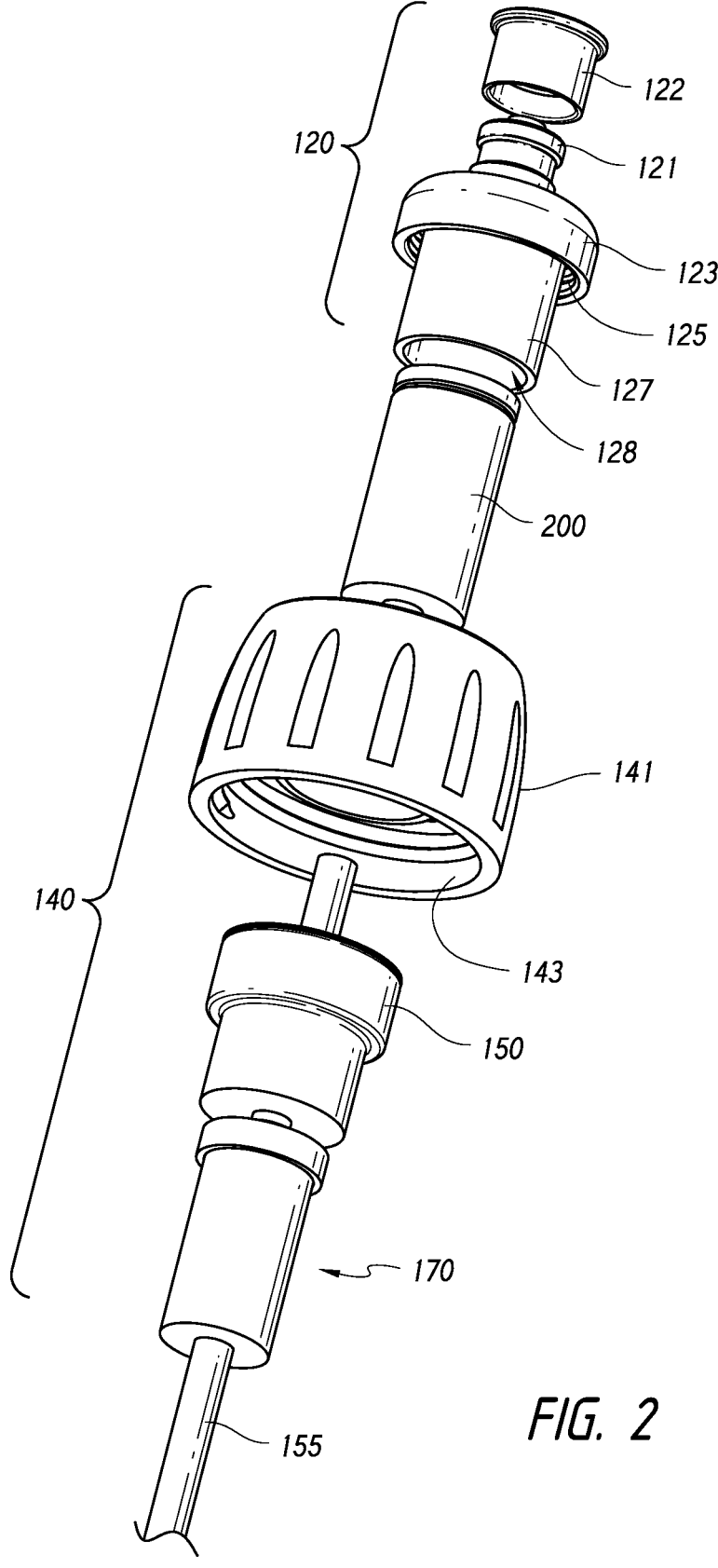
FIG. 2 is a detailed exploded isometric view of an additive delivery system according to an aspect of the invention.

Referring additionally to FIG. 2, upper cap assembly 120 may include a spout 121 and a re-sealable spout closure 122 that cooperates therewith in a known manner. Upper cap assembly may also include an upper cap 123 having threaded interior wall 125 and an additive module enclosing wall 127 defining an additive module receiving space 128 for receiving additive module 200.

Lower cap assembly 140 may include a lower cap 141 having a container engaging female threaded portion 143 and an outer surface with gripping recesses formed therein. A lower additive module enclosure 150 cooperates with the lower cap 141 and upper cap assembly 120 to house and enclose additive module 200, as will be described below. Lower cap assembly 140 may include a filter assembly 170, which houses a filter for filtering the base liquid. A delivery tube 155 extends to the bottom of the base liquid container and provides for the travel of base liquid through the filter assembly 170, lower cap assembly 140, additive module 200 and, ultimately, to spout 121, as will be described in more detail below.

Figure 3:
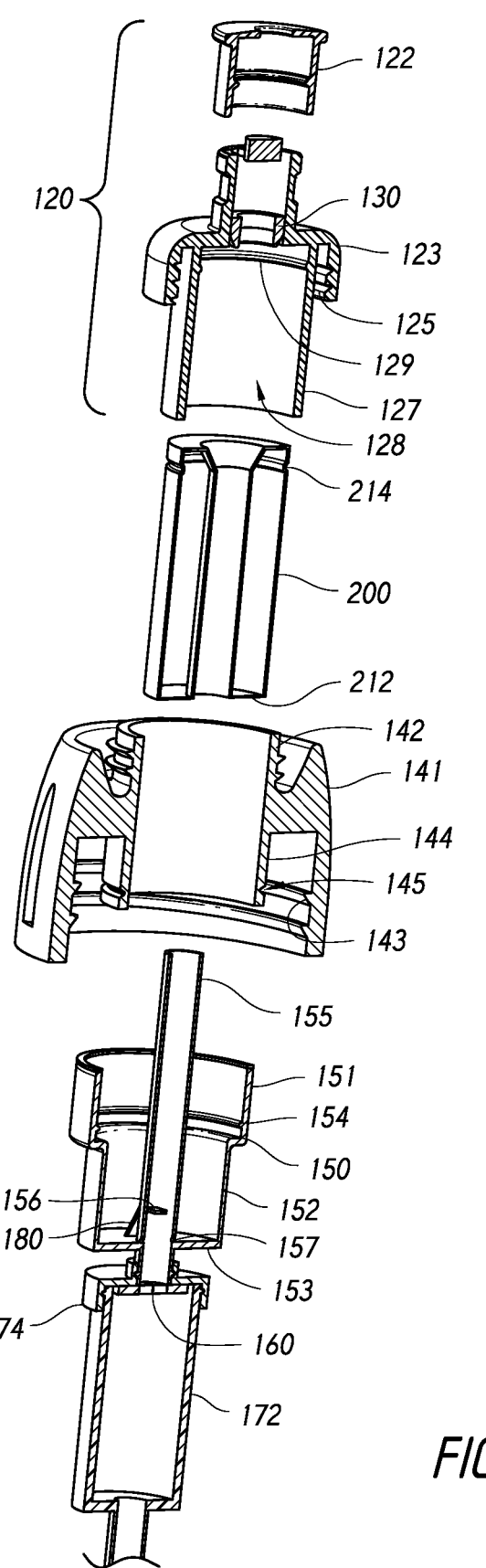
FIG. 3 is a cross-sectional exploded view of the additive delivery system of FIG. 2.

Referring additionally to the cross-sectional exploded view in FIG. 3, the additive module enclosing wall 127 of upper cap assembly 120 may include a retaining lip formed therein for engaging a retaining groove 214 on additive module 200. Lower cap assembly 140 may include an upper cap engaging male threaded portion 142 for engaging the female threads 125 on the upper cap 123. As will be recognized, this configuration allows easy removal and replacement of the additive module by the consumer as the upper cap assembly 120 may be unscrewed and removed with the additive module 200 remaining secured on the upper cap assembly 120 by way of the retaining lip 129 and retaining groove 214, which provide a snap fitting of the additive module 200 to the upper cap assembly. In addition, during removal of upper cap assembly 120, the lower cap 141 may remain secure on the container, preventing contamination or spillage of the base liquid.

According to an aspect of the invention, for safety and sanitary purposes, the additive module 200 may be provided with a transparent safety enclosure cap, which may engage the cap threads 125, and enclosed the additive module 200. In this configuration, the spout 121, spout closure 122 and safety enclosure cap (and thus the additive module, snap fit within the cap) may be sealed within a frangible thermoplastic membrane for consumer safety and product freshness. The transparent safety cap allows consumers to view the details/branding of the additive module before purchase, for example.

Lower cap 141 may also be provided with an annular wall 144 for engaging and fitting within a correspondingly-shaped upper annular wall 151 on the lower additive module enclosure assembly 150. Annular wall 144 may be provided with a retaining groove 145 for receiving a cooperating retaining lip 154 formed on the interior of upper annular wall 151 of the lower additive module enclosure assembly 150. A lower annular wall 152 and bottom wall 153 define a space for receiving a lower portion of the additive module 200. One or more additive module membrane piercing projections 180 may extend upward from the bottom wall 153 to pierce a frangible membrane 212.

Tube 155 extends upward through the lower module enclosure assembly 150 to permit flow of the base liquid. One or more metering ports 157 may be formed in the tube 155 near the bottom wall 153 to permit flow of additive concentrate from the interior of lower additive module enclosure 150 to the interior of tube 155 by venturi effect as the base liquid is drawn through tube 155. One or more mixing projections 156 may extend within the interior of tube 156 to induce turbulent flow and thereby mix the additive concentrate with the base fluid.

Filter assembly 170 may include a filter housing 172, which is snapped in place on a corresponding filter housing top 174 using a lip and groove retainer. A one-way check or flapper valve 176 formed of silicone rubber may be provided at the inlet of tube 155 from the interior of filter housing 172 to prevent backflow of the base fluid into the filter housing 172. An active carbon filter element (not shown in FIG. 3) may be provided on the interior of filter housing 172, as will be described in more detail below.

Figure 4:
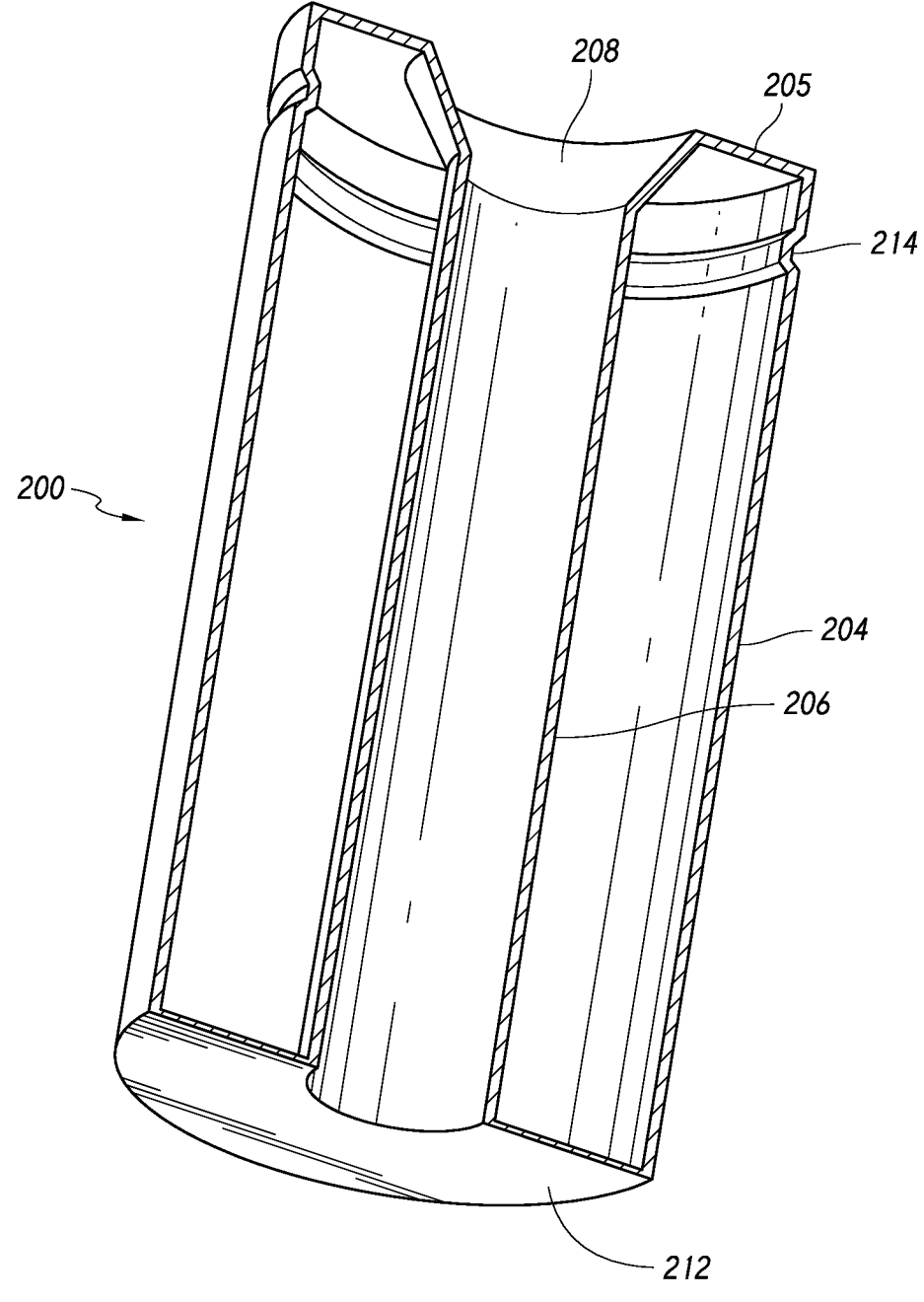
FIG. 4 is an isometric view of an additive container according to an aspect of the invention.

Referring additionally to FIG. 4, an additive module 200 according to aspects of the invention may include a generally cylindrical shape having an outer wall 204 provided with a retaining groove 214 formed therein and extending to a top wall 205 having a conical sealing surface 208. Conical surface 208 is adapted to sealingly engage a correspondingly shaped flexible seal 130 (FIG. 3), which may be made of silicone rubber or other material, and provided in upper cap assembly 120. An interior annular wall 206 defines, with upper wall 205 and outer wall 204, an interior additive containing space 210 for containing an additive, such as flavor or supplement concentrate. A frangible lower membrane 212, which may be made of foil or other material, forms a lower wall to contain and seal the additive within the module. As will be recognized, the module configuration provides for a consumer to carry and preserve a number of different additives for use with the additive delivery system and a single supply of base liquid in a container, such as a sports bottle.

Figure 5:
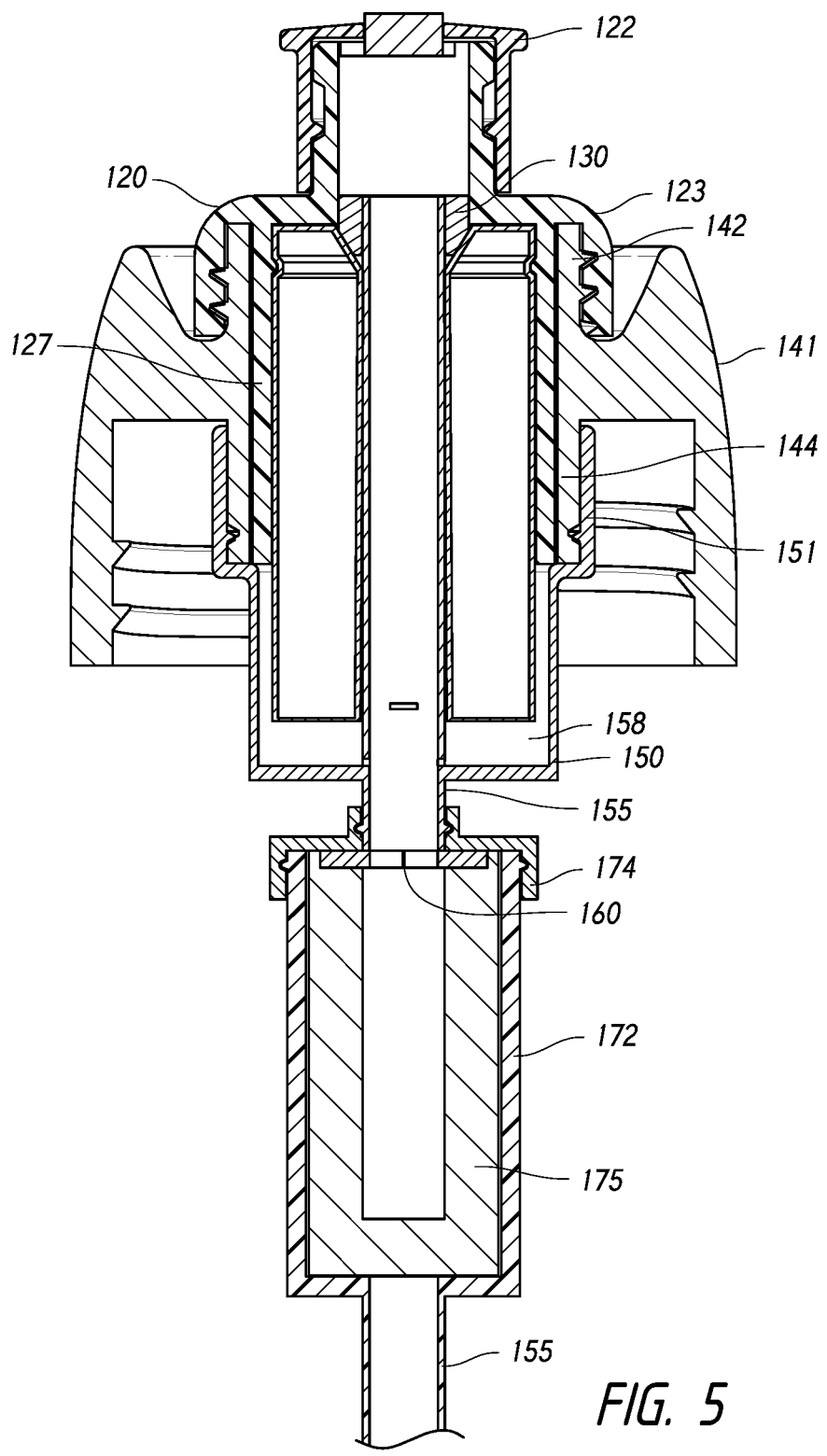
FIG. 5 is a cross-sectional view of an assembled additive delivery system according to an aspect of the invention.

FIG. 5 illustrates a cross-section of an assembled additive delivery system according to an aspect of the invention. Spout closure 122 is shown in a closed position. Upper cap 123 is shown in an engaged position (i.e., screwed on) on the male threaded portion 142 of the lower cap 141, with the additive module enclosing wall 127 of the upper cap assembly 120 extending downward into the annular opening of the lower cap 141 and securing the additive module 200 therein. The upper annular wall 151 of lower additive enclosure assembly 150 engages the module holder receiving wall 144 of the lower cap assembly 140 via lip 154 and groove 145 to provide a snap fitting. Upper cap assembly 120, lower cap assembly 140 and lower additive module enclosure assembly thereby cooperate to provide a sealed containing space for the additive module 200.

Tube 155 extends upward within the inner tube formed by inner wall 206 of additive module 200. The conical sealing surface 208 is engaged by a correspondingly shaped silicone seal 130 secured within the upper cap assembly 120. In this position, the frangible membrane 212 of additive module 200 would be pierced or ruptured by piercing projections 180 (FIG. 3) and additive concentrate stored within additive module 200 would flow into the space 158. FIG. 5 also shows a cylindrical active carbon filter element 175 housed within the filter housing 172 to filter the base fluid.

Figure 6:
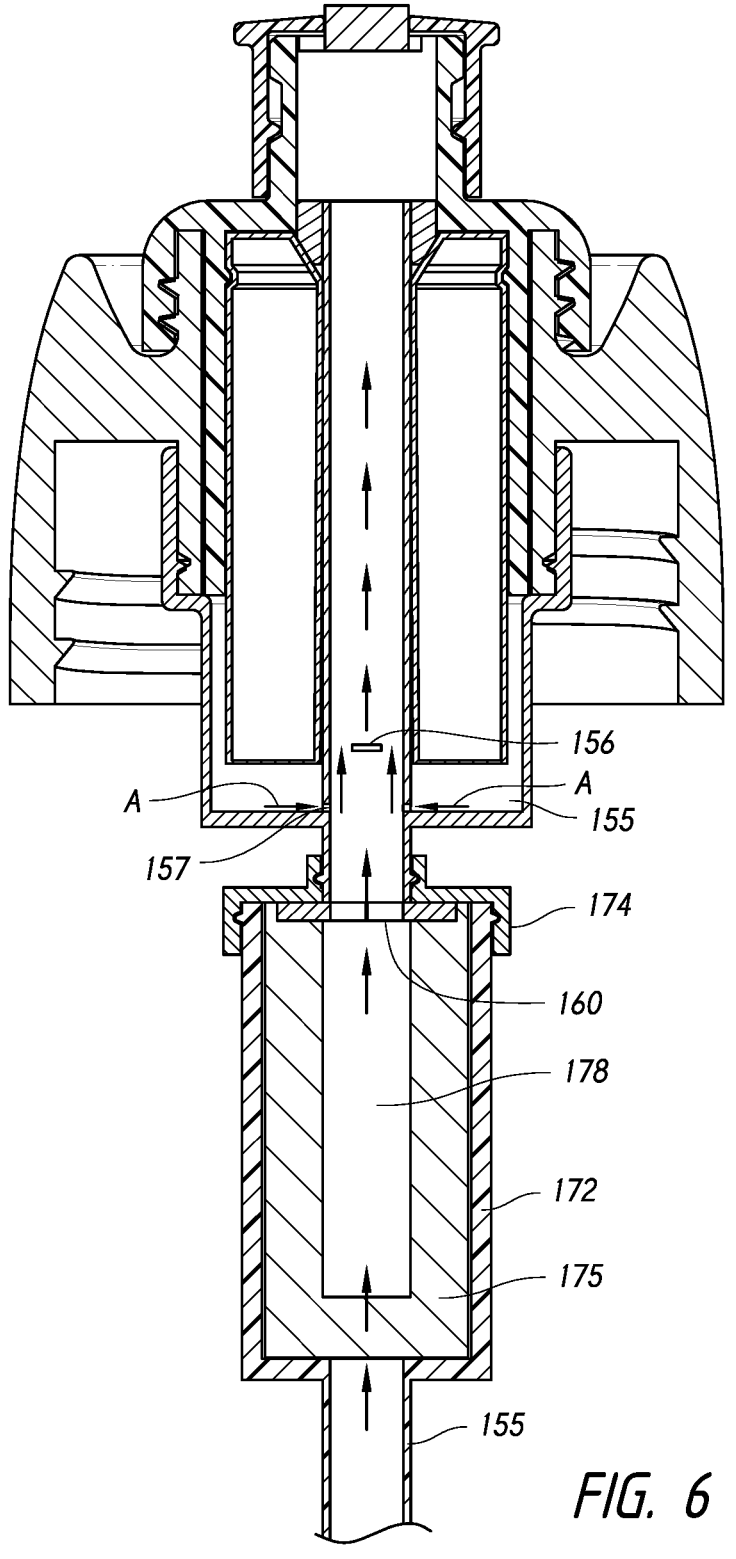
FIG. 6 is a cross-sectional view showing flow paths of an additive delivery system according to an aspect of the invention.

Referring additionally to FIG. 6, the base fluid is filtered as it flows from the lower portion of tube 155 to an interior space 178 defined by filter element 172, through the check valve 160, and upward into the upper portion of tube 155. Owing to a venturi effect, additive concentrate, represented by arrows "A" is drawn from the space 158, through metering ports 157 and into the interior of tube 155 where additive is mixed with the base fluid. Applicants have discovered that metering ports having a diameter of approximately 0.03 inches provide for suitable metering of additive liquid, while permitting the retention (non-leakage) of additive liquid from the additive module when flow of the base liquid is not occurring. As will be recognized, the diameter of metering ports may be varied depending on the viscosity of the additive liquid and other parameters such that flow occurs when needed but not when the base liquid is not flowing in the delivery tube. Mixing projection 156 enhances the mixing and uniform dilution of the additive within the base fluid. The mixed additive and base fluid composition continues up the tube 155 through the spout As will be recognized, the flow of fluid through the system may be facilitated by suction provided by the consumer or by the squeezing of the container, which may be made of a suitably flexible material, or by both. As will also be recognized, flow from the base liquid container, through the filter assembly, delivery tube and additive module is substantially in a single, linear direction, without diversion, thereby providing for efficient flow of base liquid and mixed additive/base-liquid composition from the container and providing a configuration that is particularly adaptable to a sports bottle or other compact, portable, handheld container.

As will also be recognized, the additive delivery system may be used with standard, disposable water or beverage bottles through suitable adaptation of the fastening implements on the lower cap assembly.

As will also be recognized, suitable thermoplastic polymers may be used to form the various aforementioned elements, including polyethylene terepthalate (PET), polycarbonate, high-density polyethylene (HDPE) and others.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents that fall within the spirit and scope of the claims that follow.

What is claimed is:

1. An additive delivery system comprising:
a base liquid container having an inner volume to hold a base liquid, a bottom and a threaded mouth;
an additive reservoir including at least one wall defining a space holding a liquid additive and an outlet from which the liquid additive exits the additive reservoir;
a cap assembly configured to threadedly engage with the threaded mouth, the cap assembly having a bottom, a top, a spout at the top of the cap assembly and configured for movement between open and closed positions to control flow of liquid from the spout, at least one wall that defines an additive reservoir cavity to receive the additive reservoir, and a metering port configured to receive the liquid additive from the outlet of the additive reservoir; and
a base liquid flowpath extending through the cap assembly to the spout, the base liquid flowpath fluidly coupled to receive the liquid additive from the metering port at a mixing area to mix the liquid additive with the base liquid, and including a delivery tube that extends from a lower end positioned near the bottom of the base liquid container to an upper end engaged with the cap assembly, and a one-way valve in the base liquid flowpath upstream of the mixing area that prevents backflow of the base liquid into the base liquid container.

2. The system of claim 1, wherein the additive reservoir cavity includes a projection configured to engage with and open the outlet of the additive reservoir to allow the liquid additive to exit the additive reservoir.

3. The system of claim 1, further comprising an additive flowpath configured to receive the liquid additive from the outlet of the additive reservoir.

4. The system of claim 3, wherein the base liquid flowpath and the additive flowpath are configured such that the liquid additive flows into the mixing area in a direction perpendicular to flow of the base liquid through the base liquid flowpath.

5. The system of claim 1, wherein the base liquid flowpath, the cap assembly and the additive reservoir are configured such that suction applied to the spout while the container is positioned below the spout causes the base liquid to flow upwardly against gravity through the base liquid flowpath and to the spout and causes the liquid additive to flow downwardly with gravity from the additive reservoir and to the metering port.

6. The system of claim 1, wherein the additive reservoir and the additive reservoir cavity are configured such that inserting the additive reservoir into the additive reservoir cavity opens the outlet of the additive reservoir.

7. The system of claim 1, wherein the additive reservoir and the additive reservoir cavity are configured such that the additive reservoir engages the cap assembly with a snap fit.

8. The system of claim 1, wherein the base liquid flowpath includes a mixing projection at the mixing area.

9. The system of claim 1, wherein the outlet of the additive reservoir includes a flexible element.

10. The system of claim 1, wherein the additive reservoir is configured such that the liquid additive flows by gravity to the metering port.

11. The system of claim 1, wherein the at least one wall of the additive reservoir is non-collapsible.

12. The system of claim 1, wherein the cap assembly includes a first portion that is configured to threadedly engage with the base liquid container and the additive reservoir is removable from the first portion of the cap assembly.

13. The system of claim 12, wherein the additive reservoir is removable from the first portion while the first portion is engaged with the base liquid container.

14. The system of claim 1, wherein the additive reservoir is separable from the metering port.

15. A drinking vessel assembly for adding an additive to a drinkable liquid, comprising:
a lower cap assembly including:
a lower cap configured to engage a vessel containing the drinkable liquid and including an upper side and a lower side,
an additive module enclosure defining a cavity to receive an additive module having a reservoir for holding the additive to be mixed with the drinkable liquid, the cavity extending from an opening at the upper side of the lower cap to the lower side of the lower cap, and
a delivery tube having a proximal end attached to a lower end of the additive module enclosure and a distal end opposite the proximal end, the delivery tube configured to deliver the drinkable liquid from a bottom portion of the vessel to the cavity.

16. The assembly of claim 15, further comprising:
an upper cap assembly including an upper cap configured to engage with a portion of the lower cap at the upper side that defines the opening; and
the additive module attached to the upper cap and mountable in and removable from the cavity of the lower cap assembly via the opening.

17. The assembly of claim 16, wherein the upper cap is configured to threadedly engage with the portion of the lower cap.

18. The assembly of claim 16, further comprising the vessel for holding the drinkable liquid.

19. The assembly of claim 18, wherein the additive module is configured to be removed from the cavity of the lower cap assembly while the lower cap assembly is engaged with the vessel.

* * * * *